United States Patent [19]
Fuller

[11] Patent Number: 6,002,866
[45] Date of Patent: Dec. 14, 1999

[54] PARTITIONING WITHIN A PARTITION IN A DISK FILE STORAGE SYSTEM

[75] Inventor: Billy J. Fuller, Colorado Springs, Colo.

[73] Assignee: Sun Microsystems, Inc., Mountain View, Calif.

[21] Appl. No.: 08/522,753

[22] Filed: Sep. 1, 1995

[51] Int. Cl.$^6$ .................................................... G06F 17/30
[52] U.S. Cl. ............................................................ 395/621
[58] Field of Search ............................................. 395/621

[56] References Cited

U.S. PATENT DOCUMENTS 5,109,485  4/1992  Smith, Jr. ........................... 395/200.08
5,270,877  12/1993  Fukushima et al. ...................... 360/48

*Primary Examiner*—Thomas G. Black
*Assistant Examiner*—Paul R. Lintz
*Attorney, Agent, or Firm*—William J. Kubida; Homer Knearl; Holland & Hart, LLP

[57] ABSTRACT

A new file system partition is added to an existing partition in disk storage space by creating a new file in the existing storage space of the existing partition and giving this file the attributes of a partition. This new file having partition attributes is referred to as a "raw file." Apparatus in a computing system for creating and accessing a raw file would comprise a storage system controller for creating a raw file of a predetermined size with the attributes of a partition, a storage space driver for accessing storage space in a data storage system and a storage access control for translating an access request for a raw file to an actual address for the raw file so the storage space driver can access the raw file based on the actual address for the raw file. Computer implemented steps create a first file of a predetermined size in a first disk file system, allocate storage locations in the first disk file system to accommodate the storage space required by the first file, store a first file allocation map indicating storage locations allocated to the first file, and convert the first file to a raw file with a unique identifier as a file partition using the same storage locations allocated to the first file. The raw file is accessed by transforming the access request for a raw file to an actual address for a storage device driver.

17 Claims, 3 Drawing Sheets

PARTITIONING WITHIN A PARTITION IN A DISK FILE STORAGE SYSTEM

BACKGROUND OF THE INVENTION

1. Field of the Invention

This invention relates to a method and apparatus for creating a partition within a partition in a disk file storage system. More particularly, the invention relates to creating a new partition within the storage space of a pre-existing partition irrespective of the file system type of the pre-existing partition or whether all of the storage space within the new partition is or is not contiguous.

2. Description of Related Art

A disk drive in a data processing system may have its storage space partitioned into one or more contiguous allotments of storage space with each partition set to a selected file system type such as FAT (File Allocation Table), HPFS (High Performance File System), UFS (UNIX File System), etc. To add a new partition in disk storage space already partitioned requires a lengthy process. First, all the files in the existing partition must be back-up preferably to another storage device. Second the old partition is split into a first partition for the old files and a second partition. The first partition must be set to the same file system type as the old partition. The new partition must be set to a selected file system type. Finally, the old files must be restored to the first partition. This process carries significant risk for the old files as dumping these files and then restoring them is not always successful.

Recently, disk space reorganizing programs have become available. These programs simplify the above process for the user. For example, the user may be able to select icons that trigger program routines to perform each of the above operations in repartitioning an existing partition of disk storage space.

What is needed is the ability to add a partition to an existing partition without having to dump and restore files (or preferably not even move files) and without having to delete the old partition to form two new partitions which must then be formatted and otherwise set to the attributes of a selected file system.

SUMMARY OF THE INVENTION

In accordance with this invention, the above problems regarding adding a new partition to an existing partition in disk storage space have been solved by creating a new file in the existing storage space of the existing partition and giving this file the attributes of a partition. This new file having partition attributes will hereinafter be referred to as a "raw file." Apparatus in a computing system for creating and accessing a raw file would comprise a storage system controller for creating a raw file of a predetermined size with the attributes of a partition, a storage space driver for accessing storage space in a data storage system and a storage access control for translating an access request for a raw file to an actual address for the raw file so the storage space driver can access the raw file based on the actual address for the raw file.

The controller includes storage allocator for allocating storage locations in a disk to accommodate the storage space required by a first file, and a converter for converting the first file to a raw file with a unique identifier as a file partition using the same storage locations allocated to the first file. The converter in the preferred embodiment is an initializer and a control storage device. The initializer initializes the first file as a raw file with attributes of a partition, and the control storage device stores a raw file allocation map based on the storage locations allocated the first file by said storage allocator.

The storage access control in one feature of the invention includes a detector for detecting whether the actual addresses for the raw file indicate one contiguous storage space or multiple noncontiguous sections of contiguous storage space. If the detector detects one contiguous storage space for the raw file, a requestor device generates a storage location request based on the actual address for that one contiguous storage space. If the detector detects multiple noncontiguous sections of contiguous storage space for the raw file, the requestor device generates multiple storage location requests with each request based on the actual address for one of the sections of contiguous storage space.

The storage access control in another feature of the invention comprises a parser for separating raw address parameters into a raw address parameter for each section of contiguous space in the raw file, a translator for translating each raw address parameter for a section of contiguous space into an actual address for the section of contiguous space, requester device for requesting storage access for each section of contiguous space based on the actual address for that section of contiguous space, and an indicator for detecting there are no more sections of contiguous storage space and indicating the access to the raw file is complete.

The inventive process includes the computer implemented steps of creating a first file of a predetermined size in a first disk file system, allocating storage locations in the first disk file system to accommodate the storage space required by the first file, storing a first file allocation map indicating storage locations allocated to the first file, and converting the first file to a raw file with a unique identifier as a file partition using the same storage locations allocated to the first file. The raw file is accessed by transforming the access request for a raw file to an actual address for a storage device driver. The transformation of the access request may be accomplished in various ways. In one preferred embodiment the transformation is accomplished by translating the raw addresses in the access request for a raw file into actual addresses and detecting whether the actual addresses for the raw file indicate one contiguous storage space or multiple noncontiguous chunks of contiguous storage space. If said detecting step detects one contiguous storage space for the raw file, a disk request based on the actual address is generated. If said detecting step detects multiple noncontiguous chunks of contiguous storage space, multiple disk requests are generated with each disk request based on the actual address for each chunk of contiguous storage space. In another preferred embodiment, the transformation of the access request is accomplished by splitting the raw addresses into a raw address for each chunk of contiguous space in the raw file, and translating the raw address for a chunk of contiguous space into an actual address for the chunk of contiguous space.

A disk request is generated for each chunk or section of contiguous space based on the actual address and the translating and generating steps are repeated until there are no more chunks of contiguous storage space in the raw file.

The invention is particularly useful as it provides a quick and efficient way in a computer system to create a new file system partition within an existing file system partition. Further, the usefulness of the invention is enhanced as it accomplishes this result without having to dump and restore existing files. Therefore, there is no risk of losing existing file.

The foregoing and other objects, features, utilities and advantages of the invention will be apparent from the following more particular description of a preferred embodiment of the invention as illustrated in the accompany drawings.

DETAILED DESCRIPTION

Figures 1, 5:
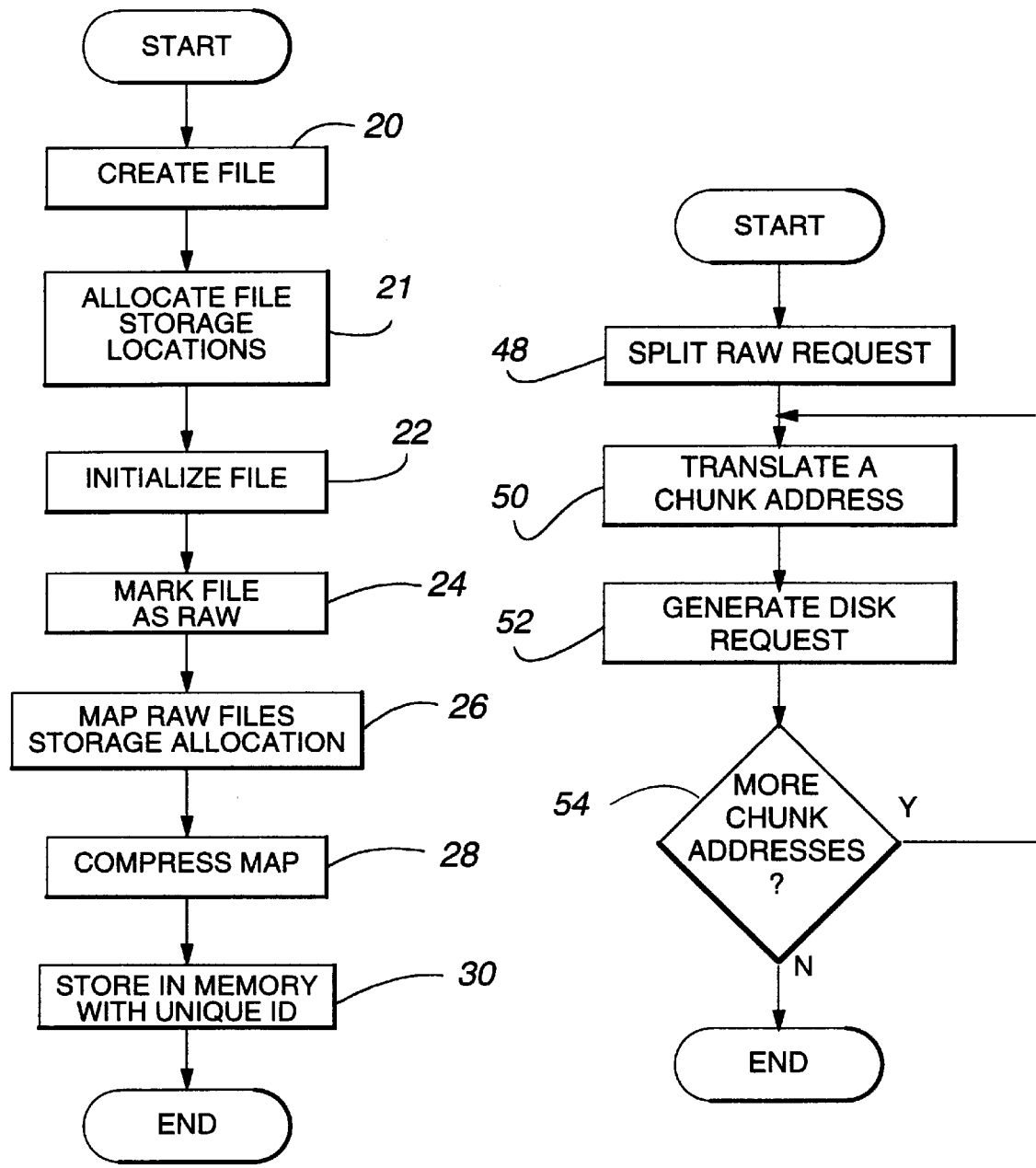
FIG. 1 illustrates the logical operations of a preferred embodiment of the invention for creating a raw file as a new partition within an existing partition.
FIG. 5 shows another preferred embodiment of the invention for converting a raw file disk request to a real disk request.

FIG. 1 illustrates the logical operations or flow of process steps required to generate a raw file. The process begins by creating a conventional file at logical operation 20. The conventional file is created within the existing partition using the existing partitions file system protocols. Step 21 allocates storage locations for the conventional file. The allocated storage locations for the file need not be contiguous. At step 22, this file is initialized to a file space desired for the new partition. All of the space requested for this new file may or may not be contiguous. As a file, there is no requirement that the storage space be contiguous. In some cases, particularly Unix, the file space is initialized by writing zeros into all of the storage locations consumed by the new file.

After the file is initialized, it is marked as a raw file by operation 24. The raw file is initialized to have the attributes of a partition. These attributes include being undeletable and having a fixed size. In other words, the file may not be erased, it may not grow, and it may not be truncated.

After the file has been initialized and marked as a raw file, step 26 maps the raw file's storage allocation. Since the raw file is created initially as a conventional file, the storage space for the raw file will likely contain non-contiguous chunks of space. A chunk or section of storage space as referred to herein means contiguous storage space. The raw file allocation map from step 26 is compressed at step 28, and the compressed map is stored in system memory by step 30. When stored in memory, the raw file allocation map is given a unique identification. separate from the original file identification for the file created and initialized at steps 20 and 22.

The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Examples of general distributed computing systems include SPARC systems offered by Sun MicroSystems, Inc., client-server systems configured from personal computers offered by IBM Corporation and by other manufacturers of IBM-compatible personal computers, and systems running the UNIX operating system.

Figure 2:
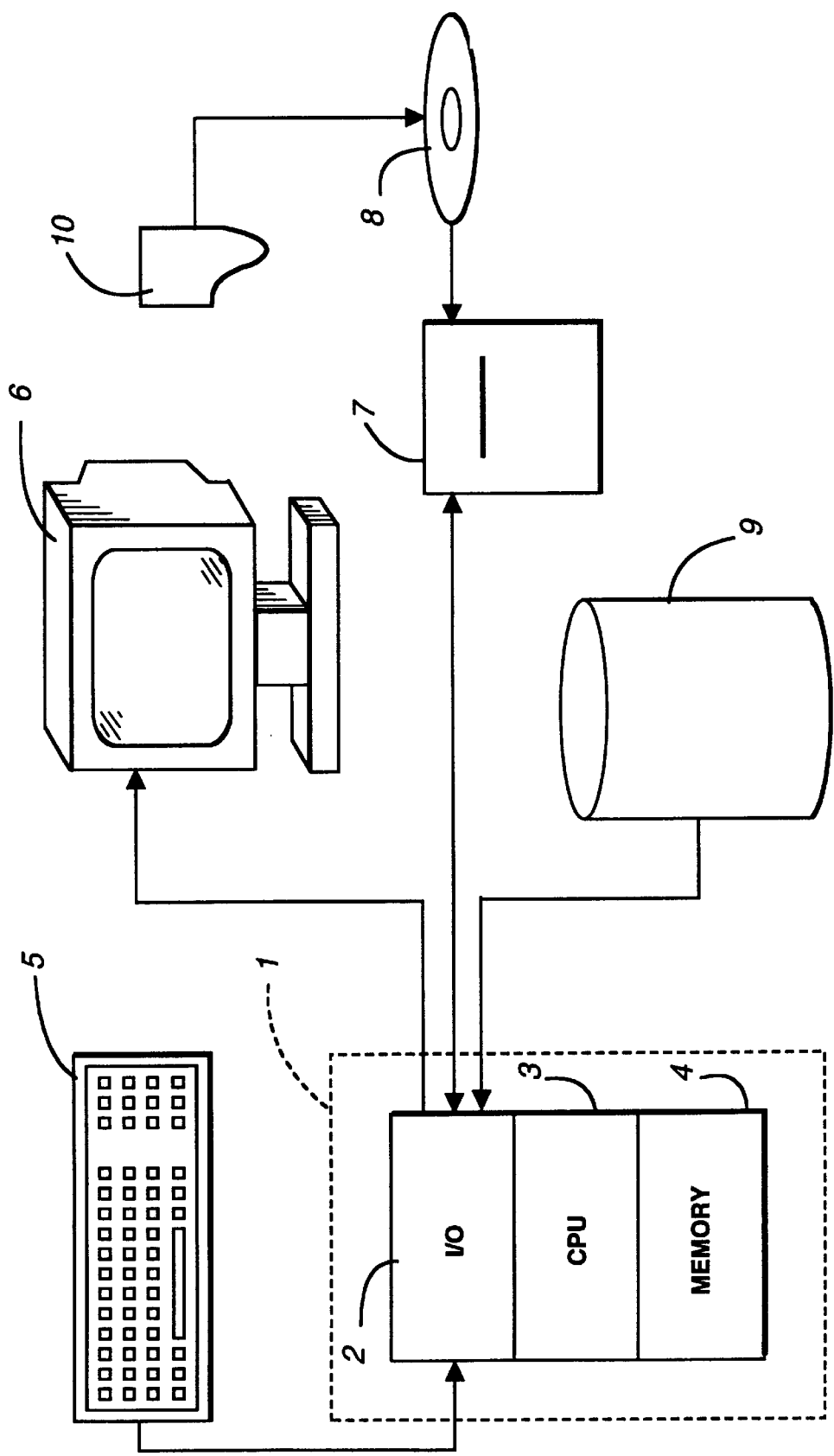
FIG. 2 shows the operating environment for the invention.

Some of the elements of a general purpose workstation computer are shown in FIG. 2, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Such mechanisms when operated in CPU 3, memory 4, and I/O section 2 of processor 1 and in disk storage unit 9 would include a storage system controller for creating files, a storage space driver for accessing storage space in the disk storage unit and a storage access control for translating access requests to an actual addresses. The storage system controller includes a storage allocator for allocating storage locations, an initializer and a control storage device. The initializer initializes files and file attributes, and the control storage device stores a file allocation map.

Figure 3:
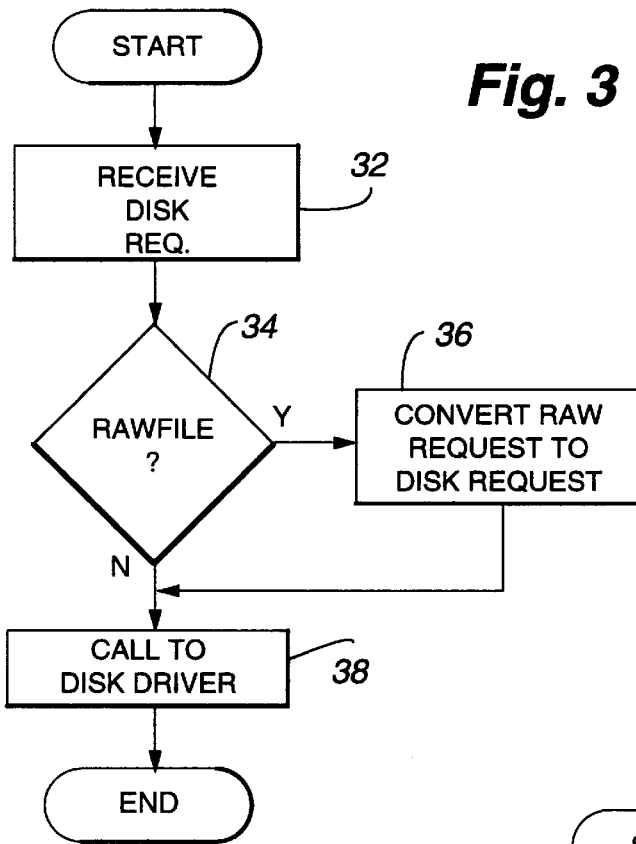
FIG. 3 shows the preferred embodiment of the invention for accessing raw files as well as conventional files.

In FIG. 3, the logical operations for interpreting conventional files and raw files at the disk driver software are illustrated. The process begins with the receipt of a disk request at step 32. A disk request or access request for access to file space on a disk is based on the offset address and the number of sectors to be accessed. A disk request is applied directly to a disk driver and does not go through a file system. In other words, a file request would normally go through a file system and be converted to a disk request. The process flow illustrated in FIG. 3 is directed to disk requests going directly to a disk driver.

Decision operation 34 tests the disk request to see if the disk request is associated with a file or a raw file. If the disk request is for a raw file, the file attributes will contain a mark as a raw file. In this event, the process flow branches yes to operation 36 to convert the disk request for a raw file to the same format as a conventional disk request. The disk request for a raw file will be referred to hereinafter as a raw request. In effect, operation 36 must translate the storage addresses in the raw request to the offset and number of sectors format of a conventional disk request. This translation, as will be discussed hereinafter, is based on the raw file's allocation map created in FIG. 1.

After the raw request has been converted to a disk request, the disk request is passed to the disk driver and the disk driver is called by operation 38 to execute the request. Of course, if the disk request received at step 32 had been a conventional disk request, i.e., not a raw file disk request, then the process would have branched "No" directly to step 38 to call the disk driver. In the highest level of process or logical operation flow, this is the flow for accessing disk space with a request that may be either a conventional disk request or a raw request (raw file disk request).

Figure 4:
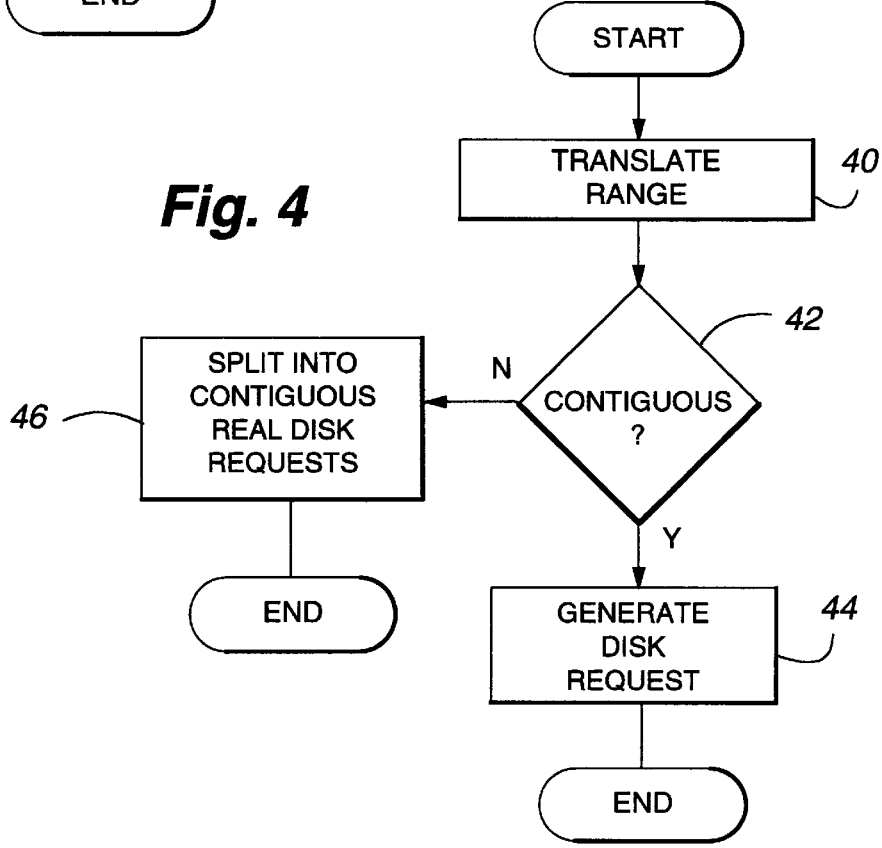
FIG. 4 shows one of the preferred embodiments of the invention for converting a raw file disk request to a real disk request.

In one preferred embodiment as illustrated in FIG. 4, the conversion operation 36 in FIG. 3 for a raw request is handled either as a disk request accessing a raw file in one contiguous space or as multiple disk requests accessing a raw file having multiple chunks in non-contiguous space. The process in FIG. 4 begins at step 40 which translates the raw request into a disk request. The translate operation 40 uses the raw file allocation map to convert a raw file address to an actual offset and number of sectors address for the actual disk request. When the translation is complete for each address specification in the raw request, the decision operation 42 tests whether all of the actual addresses for the disk request specify a single contiguous space on the disk. If so, operation 44 then generates the single actual disk request for the contiguous space.

If decision operation 42 detects that the actual addresses generated by the translation operation 40 are not contiguous, the process branches "No" to operation 46. In operation 46, the multiple non-contiguous actual addresses are split into multiple disk requests. Each disk request will access a contiguous portion of the raw file partition based on the offset and number of sectors in the disk request for that contiguous portion. After all of the multiple disk requests are generated the response to the raw request is complete.

FIG. 5 illustrates an alternative embodiment for the conversion operation 36 in FIG. 3. In FIG. 5, the process begins at operation 48. Operation 48 splits the raw request into contiguous chunks of actual disk space. The raw request has multiple address parameters with an address parameter for each portion of contiguous space making up the raw file or partition. Accordingly, operation 48 splits the raw request into a list of requests for chunks of space.

After the raw request has been split into a list of raw addresses specifying a chunk of contiguous storage space on the disk, operation 50 translates each raw address into an actual address for the disk. Operation 50 uses the raw file allocation map to convert the raw address parameter into an offset and number of sections which is the actual address to be used by the disk driver software. When the translation of the raw address is complete, operation 52 retrieves the translated actual address and generates the disk request for that chunk of space on the disk.

After the disk request is generated and passed to operation 38 in FIG. 3, decision operation 54 detects whether there are more raw addresses to be translated. If there are more raw addresses, the process branches "Yes" back to operation 50 to retrieve and translate the next raw address to a real or actual address. If all chunk addresses in the raw file or partition have been translated, then 0the process branches "No" from operation 54. This completes the translation process in FIG. 5, and the retrieval of the raw file or partition as performed by FIG. 5 in combination with the process of FIG. 3.

While the invention has been particularly shown and described with reference to a preferred embodiment thereof, it will be understood by those skilled in the art that various other changes in the form and details may be made therein without departing from the spirit and scope of the invention.

What is claimed is:

1. In a data processing system a method for managing a disk file as a disk file system partition, said partition is without a requirement that all storage space in the partition be contiguous, said method comprising the steps of:

creating a first file of a predetermined size in a first disk file system;

allocating storage locations in the first disk file system to accommodate the storage space required by the first file and storing a first file allocation map indicating storage locations allocated to the first file; and converting the first file to a raw file with a unique identifier as a file partition, said raw file using the same storage locations allocated to the first file by said allocating step.

2. The method of claim 1 wherein said converting step comprises the steps of:

marking the first file as a raw file;

initializing the raw file with attributes of a partition;

reading the first file allocation map;

storing the first file allocation map as the raw file allocation map with a unique identifier as a file partition, said raw file using the same storage locations allocated to the first file by said allocating step.

3. The method of claim 2 and in addition the step of:

accessing said raw file in a first instance as a file and in a second instance as a partition.

4. The method of claim 1 and in addition the steps of:

detecting an access request for a raw file;

transforming the access request for a raw file to a transformed access request and passing the transformed access request to a disk driver.

5. The method of claim 4 wherein said transforming step comprises the steps of:

translating the raw addresses in the access request for a raw file into actual addresses in the transformed access request passed to the disk driver to access the raw file storage space;

detecting whether the actual addresses for the raw file indicate one contiguous storage space or multiple non-contiguous chunks of contiguous storage space;

if said detecting step detects one contiguous storage space for the raw file, generating a disk request based on the actual address; and if said detecting step detects multiple noncontiguous chunks of contiguous storage space, generating multiple disk requests with each disk request based on the actual address for a different one of the chunks of contiguous storage space.

6. The method of claim 4 wherein the access request for a raw file contains one or more raw addresses and said transforming step comprises the steps of:

splitting the raw addresses into a raw address for each chunk of contiguous space in the raw file;

translating the raw address for a chunk of contiguous space into an actual address for the chunk of contiguous space;

generating a disk request for the chunk of contiguous space based on the actual address for the chunk of contiguous space;

detecting whether there are more chunks of contiguous storage space in the raw file; and repeating said translating step, said generating step and said detecting step until said detecting step detects there are no more chunks of contiguous storage space in the raw file.

7. In a computer system having a file system, apparatus for creating and accessing a disk file partition within an existing partition, said apparatus comprising:

a storage system controller for creating a raw file of a predetermined size in a data storage system, said raw file having the attributes of a partition except that said raw file may contain noncontiguous sections of storage space;

a storage driver for accessing storage space in a data storage system based on an actual address for storage space in the storage system;

a storage access control for translating an access request for a raw file to an actual address for a raw file and passing the actual address to said storage driver; and said storage driver for accessing the raw file storage space in response to the actual address for a raw file.

8. The apparatus of claim 7 wherein said storage controller further comprises:

an storage allocator for allocating storage locations in a disk to accommodate the storage space required by a first file; and a converter for converting the first file to a raw file with a unique identifier as a file partition, said raw file using the same storage locations allocated to the first file by said allocator.

9. The apparatus of claim 8 wherein said converter comprises:

an initializer for initializing the first file as a raw file with attributes of a partition;

control storage for storing a raw file allocation map based on the storage locations allocated the first file by said storage allocator.

10. The apparatus of claim 7 wherein said storage access control comprises:

a detector for detecting whether the actual addresses for the raw file indicate one contiguous storage space or multiple noncontiguous sections of contiguous storage space;

a requester for generating a disk request based on the actual address for that one contiguous storage space if said detector detects one contiguous storage space for the raw file; and said requester for generating multiple disk requests with each disk request based on the actual address for a different one of the sections of contiguous storage space if said detector detects multiple noncontiguous sections of contiguous storage space for the raw file.

11. The apparatus of claim 7 wherein the access request for a raw file contains one or more raw addresses, and said storage access control comprises:

a parser for parsing raw address parameters into a raw address parameter for each section of contiguous space in the raw file;

a translator for translating each raw address parameter for a section of contiguous space into an actual address for the section of contiguous space;

requestor for requesting storage access for each section of contiguous space based on the actual address for the section of contiguous space;

indicator for detecting there are no more sections of contiguous storage space and indicating the access to the raw file is complete.

12. A computer program storage medium readable by a computing system and encoding a program of instructions for executing a computer process for creating and accessing a disk file partition within an existing partition, said computer process comprising the steps of:

creating a raw file of a predetermined size in a data storage system, said raw file having attributes of a partition;

translating an access request for a raw file to an actual address for a raw file and passing the actual address to a storage space driver; and accessing the raw file storage space in response to the actual address for a raw file.

13. The computer program storage medium of claim 12 wherein said raw file attributes comprise no growth or no truncation of the raw file and no deletion of the raw file.

14. The computer program storage medium of claim 12 wherein said step of creating a raw file comprises the steps of:

creating a first file of a predetermined size in a first disk file system;

allocating storage locations in the first disk file system to accommodate the storage space required by the first file and storing a first file allocation map indicating storage locations allocated to the first file; and converting the first file to a raw file with a unique identifier as a file partition, said raw file using the same storage locations allocated to the first file by said allocating step.

15. The computer program storage medium of claim 14 wherein said step of converting comprises the steps of:

marking the first file as a raw file;

initializing the raw file with attributes of a partition;

storing the first file allocation map with a unique identifier as a raw file allocation map.

16. The computer program storage medium of claim 15 wherein said step of translating comprises the steps of:

using the raw file allocation map to convert raw addresses for the raw file into actual addresses for the raw file;

detecting whether the actual addresses for the raw file indicate one contiguous storage space or multiple noncontiguous sections of contiguous storage space;

if said detecting step detects one contiguous storage space for the raw file, generating a disk request based on the actual address for that one contiguous storage space; and if said detecting step detects multiple noncontiguous sections of contiguous storage space, generating multiple disk requests with each disk request based on the actual address for a different one of the sections of contiguous storage space.

17. The computer program storage medium of claim 15 wherein said step of translating comprises the steps of:

parsing raw address parameters into a raw address parameter for each section of contiguous space in the raw file;

using the raw file allocation map to translate each raw address parameter for a section of contiguous space into an actual address for the section of contiguous space;

requesting storage access for each section of contiguous space based on the actual address for the section of contiguous space;

detecting there are no more sections of contiguous storage space and indicating the access to the raw file is complete.

* * * * *